April 9, 1946.  W. H. RODEFELD  2,398,327

SELF-LOADING HAY CONVEYANCE

Filed Jan. 4, 1945

Inventor
William H. Rodefeld.

Patented Apr. 9, 1946

2,398,327

UNITED STATES PATENT OFFICE 2,398,327

SELF-LOADING HAY CONVEYANCE

William H. Rodefeld, Richmond, Ind.

Application January 4, 1945, Serial No. 571,217

2 Claims. (Cl. 214—78)

My present invention relates to machinery for handling hay and similar material.

The principal object of this invention is the provision of a machine combining raking and loading mechanism with a conveyance to provide means for more efficient work.

Another object is the provision of a machine combining raking and loading mechanism with a conveyance so that raking and loading and transporting material can all be done with one piece of equipment.

Another object is the provision of a machine combining raking and loading mechanism with a conveyance so that raking and loading and transporting material can be accomplished with less labor than with other means.

I attain these objects by mechanism illustrated in the accompanying drawing, in which—

Figure 1:
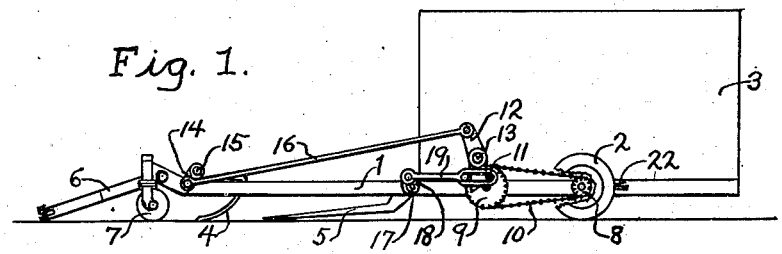
Figure 1 is a side view showing a wheeled conveyance in combination with a set of raking teeth and a set of loading teeth and mechanism to operate the raking teeth and the loading teeth.
Figure 2:
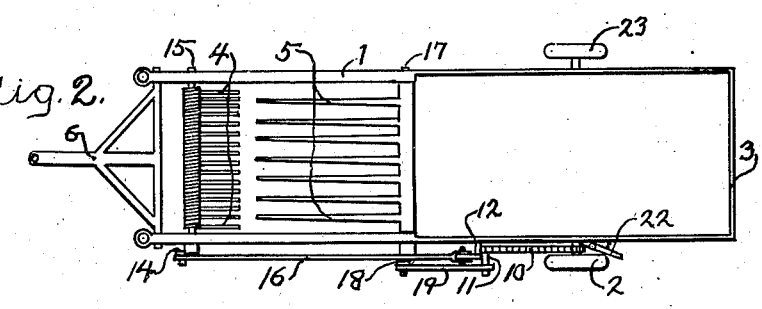
Figure 2 is a plan view.
Figure 3:
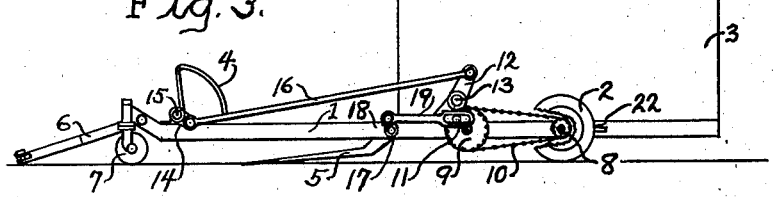
Figure 3 is a side view showing the raking teeth in raised position.
Figure 4:
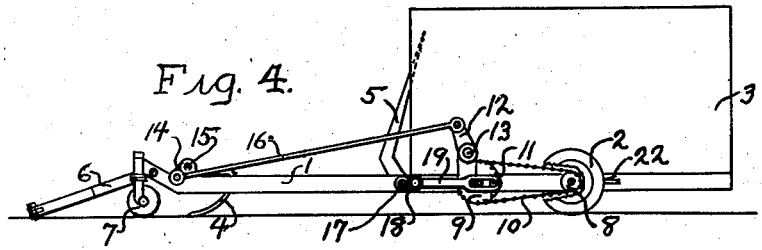
Figure 4 is a side view showing the loading teeth in raised position.
Figure 5:
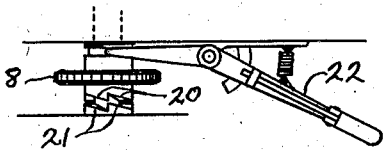
Figure 5 is an enlarged partial top view showing a sprocket that drives the mechanism that operates the raking teeth and the loading teeth and shows means for engaging and disengaging the driving sprocket and the hub of a rear wheel to put the mechanism in or out of operation.

In Figures 1, 3, and 4 the rear wheel of the conveyance is shown partly cut away to show the driving sprocket and chain.

Similar numerals refer to similar parts throughout the several views.

The frame 1, the wheels 2 and 23, the front wheels 7, the tongue 6 and the sides 3 constitute the conveyance.

The raking teeth 4 carried by the shaft 15 near the front end of the machine are arranged to rake up hay or similar material as the machine is pulled forward and to raise and drop the material in bunches. The loading teeth 5 located immediately back of the raking teeth 4 pick up the bunched material and then swing upward and to the rear to put the material onto the conveyance.

The loading teeth 5 then return to the ground in time to pick up the next bunch of material.

The driving sprocket 8 is shifted by the lever 22 to put the operating mechanism in gear. A driven sprocket 9 located forward of the driving sprocket 8 is connected thereto by a chain 10.

Extending from the face of the sprocket 9 and eccentric thereto is a crank-pin 11.

A rocker arm 12 supported by a bearing 13 is struck by the crank-pin 11 as the sprocket 9 rotates.

A rod 16 connects the rocker arm 12 and an arm 14 secured to the shaft 15 and the raking teeth 4 are raised when the crank-pin 11 strikes the rocker arm 12.

The loading teeth 5 are carried by a shaft 17. Secured to shaft 17 is an arm 18 and connected thereto is a link 19. The rear end of the link 19 is slotted and the crank-pin 11 extends through the said slot. When sprocket 9 rotates the crank-pin 11 moves in the said slot in link 19 while the crank-pin 11 is in a forward position but when the crank-pin 11 moves to the rear it reaches the end of the said slot and then moves the link 19 to swing the loading teeth 5 up and to the rear to put material on the conveyance.

The clutch teeth 20 on the hub of sprocket 8 engage the clutch teeth 21 which are on the hub of the left rear wheel of the conveyance to put the mechanism in operation.

Having now described the invention, what I claim, and desire to secure by Letters Patent of the United States, is:

1. A machine to rake and take up hay and similar material while in continuous forward movement having a carrying compartment on a wheeled chassis, a set of raking teeth near the front of said chassis arranged to rake material as the machine moves forward, mechanism to raise the said raking teeth to drop the material in bunches, a set of tines hinged to the machine and extending forward with the points thereof being behind the said raking teeth and in contact with the ground when the said tines are in lowered position so that the said tines pass under the bunched material as the machine moves forward and mechanism to raise the said tines to elevate the bunched material to the carrying compartment.

2. A machine to rake and take up hay and similar material while moving consisting of a wheeled chassis with a carrying compartment thereon, a set of raking teeth near the front of said chassis arranged to rake material as the machine moves and arranged to release the raked material at intervals and leave it bunched and a set of tines hinged to the machine behind the said raking teeth and extending forward toward the said raking teeth and in position to pass under bunched material left by the said raking teeth and arranged to be swung upward to elevate material to the said carrying compartment and mechanism to operate the said raking teeth to release raked material and the said tines to elevate material and arranged to time the movements of the said teeth and the said tines so the tines are down when the raking teeth release raked material and so the raking teeth are raking material when the tines elevate material.

WILLIAM H. RODEFELD.